(12) United States Patent
Farber et al.

(10) Patent No.: US 8,478,087 B2
(45) Date of Patent: Jul. 2, 2013

(54) OPTICAL LIMITER

(75) Inventors: Allan Farber, Hashmonaim (IL); Ariela Donval, Ramat Gan (IL); Doron Nevo, Ra'anana (IL); Moshe Oron, Rehovot (IL); Ram Oron, Rehovot (IL)

(73) Assignee: KiloLambda Technologies Ltd., Tel Aviv (IL)

( * ) Notice: Subject to any disclaimer, the term of this patent is extended or adjusted under 35 U.S.C. 154(b) by 2710 days.

(21) Appl. No.: 10/398,859

(22) Filed: Apr. 9, 2003

(65) Prior Publication Data
US 2008/0279231 A1 Nov. 13, 2008

Related U.S. Application Data

(63) Continuation-in-part of application No. PCT/IL03/00017, filed on Jan. 6, 2003.

(30) Foreign Application Priority Data

Jan. 10, 2002 (IL) .......................................... 147554

(51) Int. Cl.
*G02B 6/26* (2006.01)
(52) U.S. Cl.
USPC .............................. 385/16; 385/122; 359/359
(58) Field of Classification Search
USPC ............................. 385/4, 8, 9, 15, 39, 50, 95
See application file for complete search history.

(56) References Cited

U.S. PATENT DOCUMENTS

| | | | | |
|---|---|---|---|---|
| 3,891,302 A | | 6/1975 | Dabby et al. | 350/96 WG |
| 3,914,464 A | | 10/1975 | Thomasson et al. | 427/54 |
| 4,732,449 A | * | 3/1988 | Fan | 385/33 |
| 4,733,931 A | | 3/1988 | Fan | 350/96.18 |
| 4,890,075 A | * | 12/1989 | Pohlmann et al. | 359/886 |
| 4,925,514 A | * | 5/1990 | Okada et al. | 156/249 |
| 4,933,929 A | | 6/1990 | Tajima | 370/3 |
| 5,017,769 A | | 5/1991 | Cohn et al. | 250/216 |
| 5,023,139 A | * | 6/1991 | Birnboim et al. | 428/402 |
| 5,113,476 A | * | 5/1992 | Okada et al. | 385/140 |
| 5,157,537 A | * | 10/1992 | Rosenblatt | 359/245 |
| 5,172,278 A | * | 12/1992 | Tutt | 359/885 |

(Continued)

FOREIGN PATENT DOCUMENTS

| EP | 0 325 431 A2 | 7/1989 | |
|---|---|---|---|
| EP | 0 783 117 A2 | 7/1997 | |
| EP | 0 943 954 A2 | 9/1999 | ........................ 385/2 |
| EP | 1 122 564 A2 | 8/2001 | |

OTHER PUBLICATIONS

Yang et al. "Probing interface properties of nanocomposites by third-order nonlinear optics," 1996, Appl. Phys. A 62, 403-415.*
Liete et al., Appl. Phys. Lett 10, 100 (1967).

(Continued)

*Primary Examiner* — Charlie Peng
*Assistant Examiner* — Peter Radkowski
(74) *Attorney, Agent, or Firm* — Nixon Peabody LLP

(57) ABSTRACT

An optical power limiter comprises an input optical transmission element, an output optical transmission element, and a power-limiting element disposed between the input and output elements for transmitting optical signals from the input element to the output element. The power-limiting element comprises an optical-limiting solid mixture containing particles of at least one material that produces reversible thermal changes in response to light above a predetermined optical power level, thereby changing the optical transmission properties of the power-limiting element.

29 Claims, 14 Drawing Sheets

U.S. PATENT DOCUMENTS

| | | | | |
|---|---|---|---|---|
| 5,173,811 A * | 12/1992 | Gumbs | .................. | 359/885 |
| 5,252,256 A * | 10/1993 | Tutt et al. | .................. | 252/582 |
| 5,280,169 A * | 1/1994 | Honey et al. | .................. | 250/216 |
| 5,287,424 A | 2/1994 | Sheem et al. | .................. | 385/885 |
| 5,337,183 A * | 8/1994 | Rosenblatt | .................. | 359/248 |
| 5,341,238 A | 8/1994 | Trost et al. | .................. | 359/359 |
| 5,347,395 A * | 9/1994 | Lautenschlager et al. | .... | 359/359 |
| 5,391,329 A * | 2/1995 | Dougherty et al. | .................. | 264/1.7 |
| 5,472,777 A * | 12/1995 | Kineri et al. | .................. | 428/323 |
| 5,530,780 A * | 6/1996 | Ohsawa | .................. | 385/31 |
| 5,542,017 A * | 7/1996 | Koike | .................. | 385/123 |
| 5,580,932 A * | 12/1996 | Koike | .................. | 525/276 |
| 5,619,600 A * | 4/1997 | Pohl | .................. | 385/15 |
| 5,633,974 A * | 5/1997 | Chia | .................. | 385/140 |
| 5,651,085 A * | 7/1997 | Chia | .................. | 385/140 |
| 5,689,595 A * | 11/1997 | Pan | .................. | 385/27 |
| 5,741,442 A * | 4/1998 | McBranch et al. | .................. | 252/582 |
| 5,805,326 A * | 9/1998 | Snow et al. | .................. | 359/241 |
| 5,881,200 A * | 3/1999 | Burt | .................. | 385/142 |
| 6,181,848 B1 * | 1/2001 | Bruno et al. | .................. | 385/24 |
| 6,218,658 B1 * | 4/2001 | Taneda et al. | .................. | 250/216 |
| 6,278,821 B1 | 8/2001 | Carberry et al. | .................. | 385/39 |
| 6,384,960 B1 * | 5/2002 | Andrieux et al. | .................. | 359/299 |
| 6,466,707 B1 | 10/2002 | Dawes et al. | .................. | 385/14 |
| 6,487,339 B2 | 11/2002 | Nishikawa | .................. | 385/32 |
| 6,611,640 B2 * | 8/2003 | LoCasclo et al. | .................. | 385/27 |
| 6,690,871 B2 * | 2/2004 | Lee et al. | .................. | 385/129 |
| 6,710,366 B1 * | 3/2004 | Lee et al. | .................. | 257/14 |
| 6,888,994 B2 * | 5/2005 | Baumberg et al. | .................. | 385/129 |
| 2001/0021292 A1 | 9/2001 | Merkel | .................. | 385/37 |
| 2002/0024752 A1 * | 2/2002 | Ando et al. | .................. | 359/885 |
| 2002/0034747 A1 * | 3/2002 | Bruchez et al. | .................. | 435/6 |
| 2002/0045675 A1 * | 4/2002 | Halas et al. | .................. | 522/81 |
| 2002/0132045 A1 * | 9/2002 | Halas et al. | .................. | 427/217 |
| 2002/0160195 A1 * | 10/2002 | Halas et al. | .................. | 428/403 |
| 2002/0186921 A1 * | 12/2002 | Schumacher et al. | .......... | 385/31 |
| 2002/0187347 A1 * | 12/2002 | Halas et al. | .................. | 428/403 |
| 2003/0010987 A1 * | 1/2003 | Banin et al. | .................. | 257/82 |
| 2003/0031438 A1 * | 2/2003 | Kambe et al. | .................. | 385/122 |
| 2005/0058415 A1 * | 3/2005 | Lee et al. | .................. | 385/122 |

OTHER PUBLICATIONS

*A Review of Optical Limiting Mechanisms and Devices Using Organics, Fullerenes, Semiconductors and Other Materials*, Tutt et al., Prog. Quant. Electr., col. 17, pp. 299-338 (1993).
*Designing Plastics Optics: New Applications Emerging for Optical Glass Substitutes*, Tribastone, et al., The Photonics Design and Applications Handbook, pp. H-454-H-460 (1997).
Liete et al., Applied Physics Letter, vol. 10, No. 3, 100-101 (1967).
*A Review of Optical Limiting Mechanisms and Devices Using Organics, Fullerenes, Semiconductors and Other Materials*, Tutt et al., Progress in Quantum Electronics, col. 17, pp. 299-338 (1993).
International Search Report dated Dec. 9, 2004.

* cited by examiner

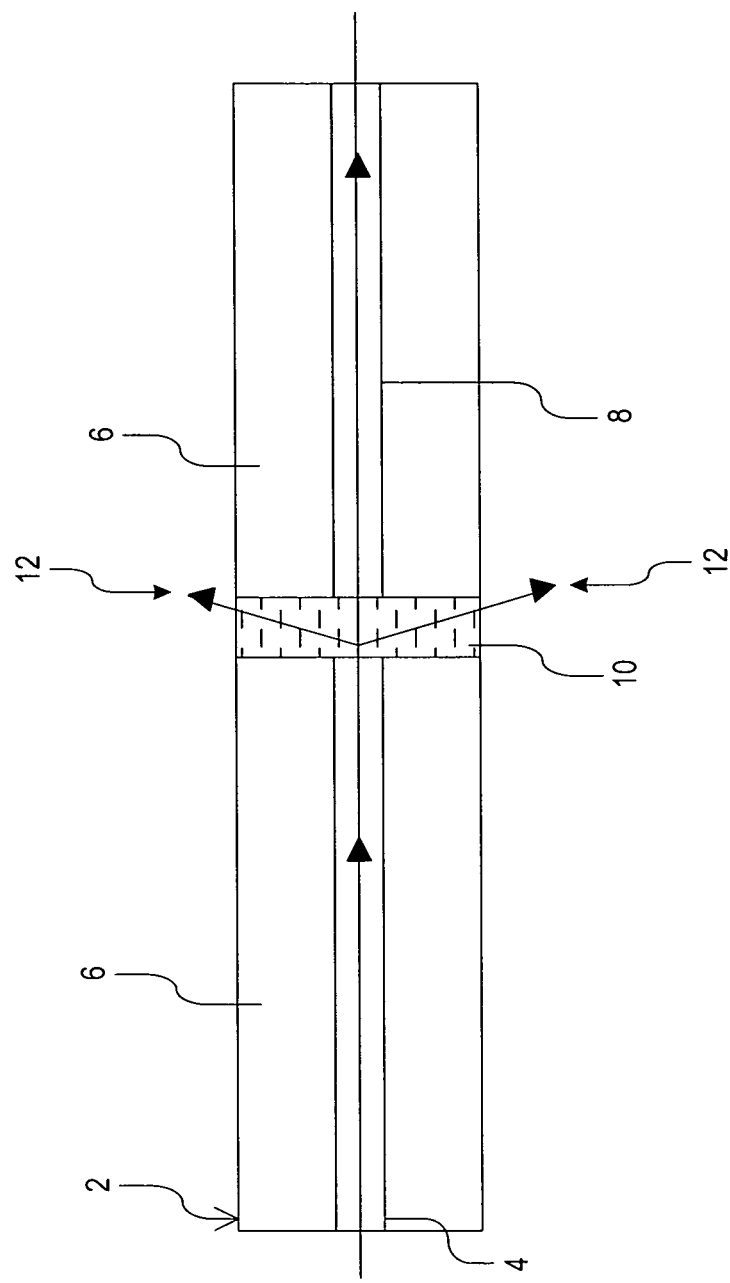
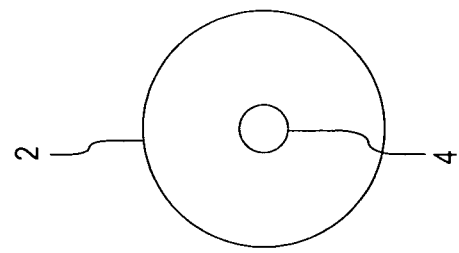

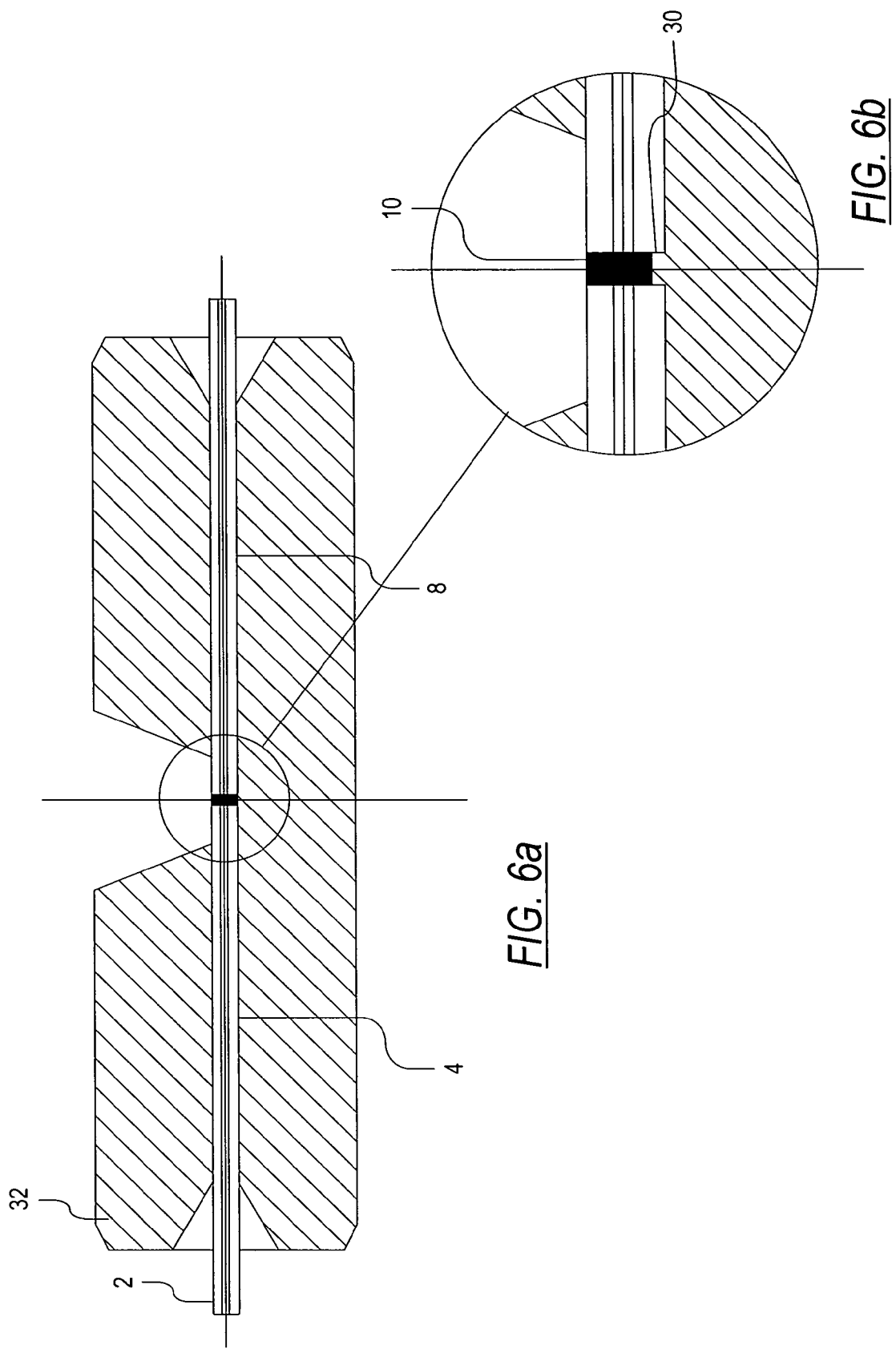

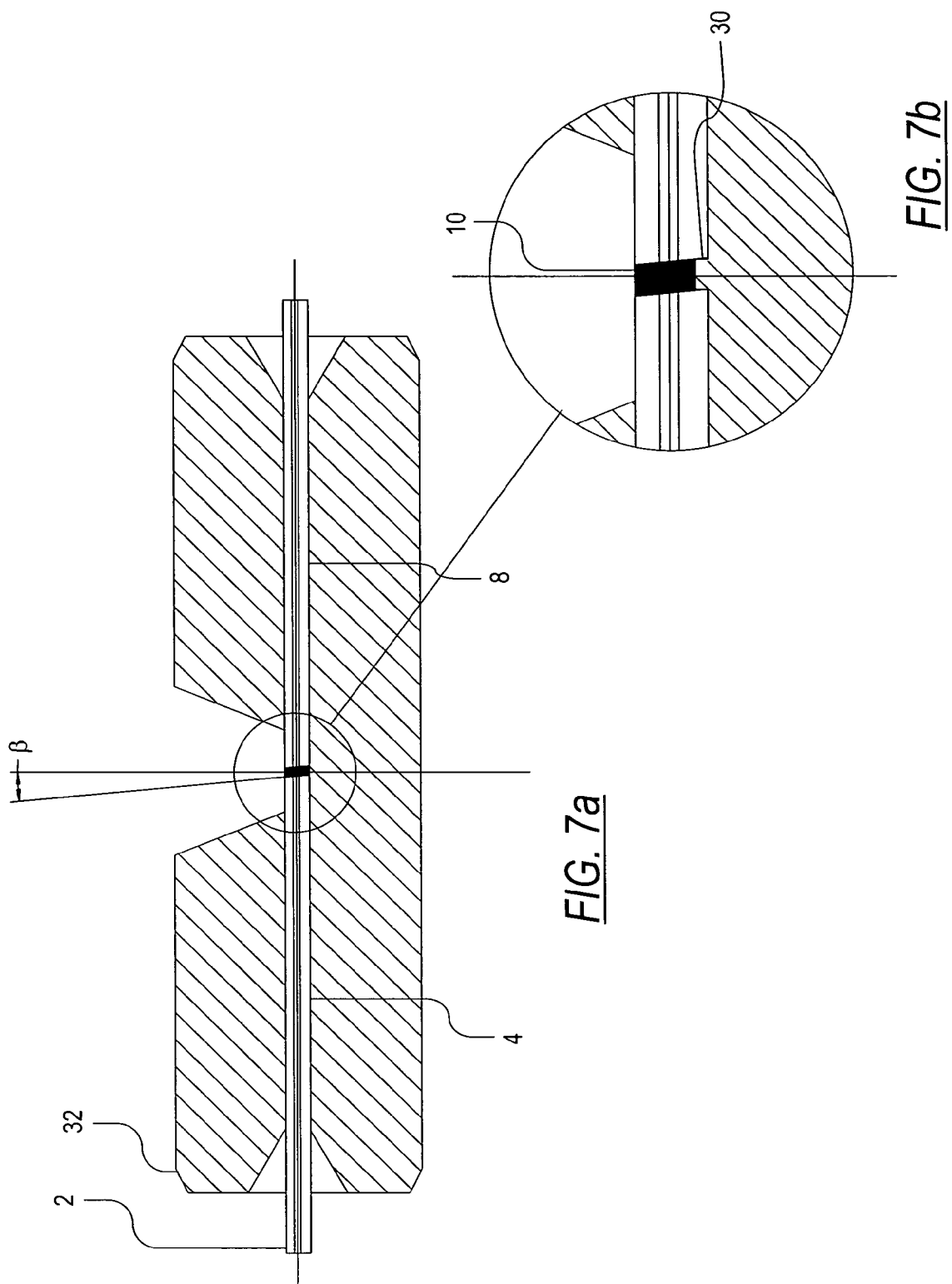

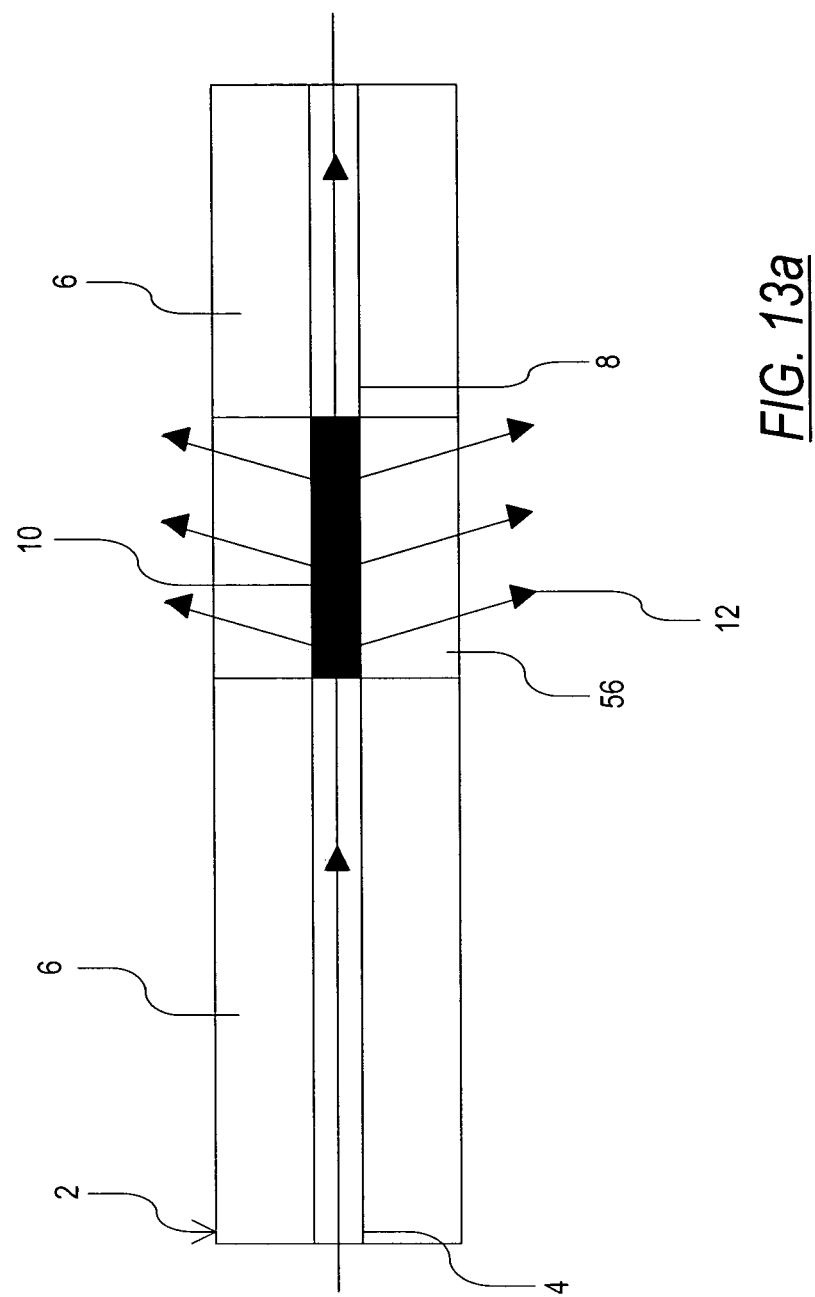
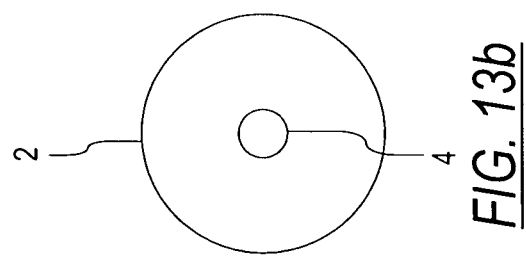

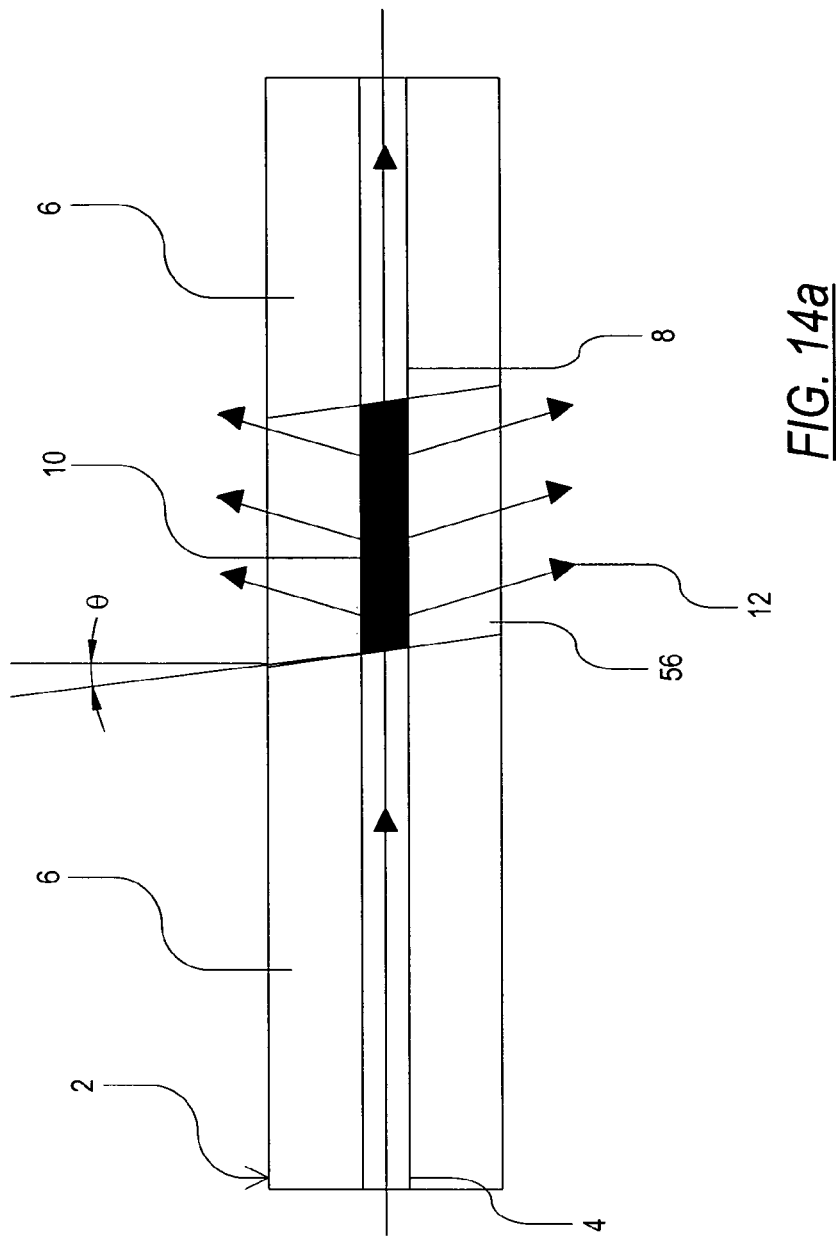
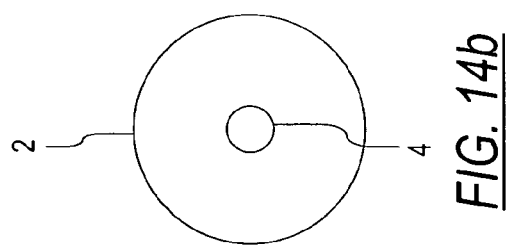

OPTICAL LIMITER

CROSS-REFERENCE TO RELATED APPLICATION

This application is a Continuation-In-Part of PCT Application No. PCT/IL 03/00017 filed Jan. 6, 2003, which claims priority from Israel Patent Application No. 147554 filed on Jan. 10, 2002.

FIELD OF THE INVENTION

The present invention relates to optical power-limiting device, and more particularly, to an optical power-limiting passive device and to a method for limiting optical power transmission.

BACKGROUND OF THE INVENTION

Optical limiters are devices designed to have high transmittance for low level light inputs and low transmittance for high power. Since the development of the first lasers, passive optical limiters have been researched and concepts have been tested to protect optical sensors against laser peak-power induced damage. The first optical limiters for CW lasers were based on thermal lensing in absorbing bulk liquids, i.e., local heating in an imaging system reduced the index of refraction, causing "thermal blooming" and resulting in a beam that was no longer focused. Other methods have been suggested for limiting pulsed laser sources such as reverse saturable absorption, two-photon and free carrier absorption, self-focusing, nonlinear refraction and induced scattering. The device itself must also possess a high threshold against damage, and not get into a state where it is "bleached-out" or transparent.

Communications and other systems in medical, industrial and remote sensing applications, may handle relatively optical high powers, from microwatts up to several watts, in single fibers or waveguides. With high intensities (power per unit area) introduced into these systems, many thin film coatings, optical adhesives, and even bulk materials, are exposed to light intensity beyond their damage thresholds. Another problem is laser safety, wherein there are well-defined upper power limits allowed to be emitted from fibers into the open air. These two issues call for a passive device that will limit the amount of energy propagating in a fiber/waveguide to the allowed level.

There have been many attempts to realize optical limiters, mainly for high power laser radiation, high power pulsed radiation, and eye safety devices. The techniques used in these devices were mainly:

1) Thermal change of the index of refraction n, in liquids having negative dn/dT, for defocusing the light beam, e.g., in an imaging system.
2) Self-focusing or self-defocusing, due to high electric field-induced index of refraction n change, through the third order susceptibility term of the optical material, here $n=n_0+n_2E^2$ where no is the index of refraction at zero electric field (no light), $n_2$ is the non-linear index change and E is the electric field strength of the light beam.
3) Colloidal Suspensions such as carbon black in both polar and non polar solvents which limit by induced scattering.

Both No. 1 and 2 of the above-mentioned techniques require very energetic laser beams or light intensities to produce a meaningful limitation. In the first technique, the volumes of liquid to be heated are large and need high powers. Another problem with this method is that the liquid is not a good optical medium and distorts the beam. In the second technique, the $n_2$ coefficient is very small for usable materials and requires very high electric fields.

In the third method, the use of liquids is problematic for most applications. In a communications system, for instance, the use of liquids in a passive device causes noise and distortion from turbulence of the liquid in the optical path. Other problems reported using the colloidal liquid as an optical-limiting medium include aging either by disappearance of the active carbon material or the formation of flocs of loosely bound carbon particles that break up only after ultrasonic deflocculation. Some work has been done on using liquid crystals as limiting material, mainly for high power pulses but these materials cause noise and distortion worse than ordinary liquids due to director fluctuations.

SUMMARY OF THE INVENTION

It is therefore a broad object of the present invention to provide an optical power-limiting device and a method for limiting power transmission, which ameliorates the disadvantages of the prior art devices and methods.

In accordance with the present invention, there is therefore provided an optical power-limiting device, comprising an optical-limiting solid mixture in an optical system of limited numerical aperture, the optical-limiting solid mixture includes means affecting its optical properties upon being subjected to optical energy, which cause thermal or electric field induced changes in said optical-limiting solid mixture when passing through.

The invention further provides a method for limiting the power transmitted at a focal point of a lens or mirror in an optical system, inside a waveguide or in a gap between waveguides, where the optical-limiting solid mixture is placed. The optical-limiting solid mixture is composed of light absorbing particles, smaller than the wavelength of visible light (smaller than 0.5 microns) and preferably smaller than 0.1 microns (nano-powder) dispersed in a solid matrix material. The light absorbing particles include at least one metallic or non-metallic material selected from the group consisting of: Ag, Au, Ni, Va, Ti, Co, Cr, C, Re, Si, $SmO_2$ and mixtures of such materials. The solid matrix material may be a transparent or optical polymer or inorganic glass material, e.g., polymethylmethacrylate ("PMMA") and its derivatives, epoxy resins, glass, spin-on Glass ("SOG"), or other sol-gel materials. The optical-limiting function begins with light absorption in the dispersed powder particles, each according to its absorption spectrum. When the particles are heated by the absorbed light, they conduct heat to their surroundings, leaving hot spots in the volume surrounded by them, and a decreasing temperature gradient in their neighborhood. These hot volumes can decrease the light transmission through the optical-limiting solid mixture by several mechanisms, one of which is scattering due to the refractive index spatial fluctuations created by the hot particle and its surrounding medium of a given, positive or negative, index change with temperature (dn/dT). The scattered light, at angles larger than a (where numerical aperture is sin α) leaves the optical path of the optical system. Some increase in the back-reflected light also may be observed. The light that is not scattered continues along the optical path having lower, "limited" power. When the incident power is reduced, the scattering volume which surrounds each absorbing particle diminishes. The transmittance through the optical-limiting solid mixture returns to its original value, and the scattering process decreases to negligible values. The process may be repeated many times without any permanent damage up to energies that are an order of magnitude or more, larger than the transmitted power limit.

Other light-scattering mechanisms may also occur simultaneously or may dominate with different choices of matrix materials or absorbing particles. These mechanisms include stimulated Raman scattering, in which light is scattered inelastically by thermally induced molecular vibrations, or stimulated Brillouin scattering, in which light is scattered inelastically by local thermally induced acoustic waves.

The light-absorbing particles are dispersed in a transparent matrix such as a monomer which is subsequently polymerized. There are many techniques for preparing such dispersions, such as with the use of dispersion and deflocculation agents added to the monomer mix. One skilled in the art of polymer and colloid science is able to prepare this material for a wide choice of particles and monomers. Similarly, techniques are well known in the art to prepare composite materials with dispersed sub-micron particles in inorganic glass matrices.

The optical power-limiting device can offer the following advantages and properties:

1. The operation of the limiter is passive; no external power is required.
2. The device operates for many cycles (e.g., thousands), limiting at high input powers and returning to its original, non-limiting state when the input power is lowered or shut off.
3. The device may be activated by a wide range of wavelengths, e.g., visible, 800, 980, 1065 1310, 1550 nm. It may have small differences in materials and dimensions to fit the desired spectral range.
4. The device withstands high intensities a few (e.g., ×10) times higher than the limiting threshold.
5. The device has relatively fast (e.g., in the microseconds region and below) response, limited by the indirect heating time of minute volumes.
6. The device has high spectral transmission (e.g., 1-2 dB insertion loss) at intensities well below the power limit.
7. The device is suitable for use as an in-line fiber insert (like a patch cord), for single or multi-mode fibers, or for fiber lasers.

Some uses of the limiter may be in the optical communication area, e.g., detector protection, switch and line protection, amplifier input signal limiting and equalizing and power surge protection. Also, power regulation in networks, in the input or at the output from components. In the areas of medical, military and laser machining, an optical power limiter may be used for surge protection and safety applications. If used as a protective device in an imaging system, the limiter will work at the image point where there appears a bright light or a laser source and limit the amount of incoming light from this source without interfering with the rest of the image.

BRIEF DESCRIPTION OF THE DRAWINGS

The invention will now be described in connection with certain preferred embodiments with reference to the following illustrative figures so that it may be more fully understood.

With specific reference now to the figures in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings:

FIG. 1a is a cross-sectional view of two waveguide sections and an optical-limiting solid mixture constituting an optical power-limiting device according to the present invention.

FIG. 1b is an end elevation of the structure of FIG. 1a.

FIG. 2 is a cross-sectional view of a connector-encapsulated optical power-limiting device, using a limiter perpendicular to the beam propagation direction, according to the present invention.

FIG. 3 is a cross-sectional view of a connector-encapsulated optical power-limiting device, using a limiter at an angle to the beam propagation direction, according to the present invention.

FIG. 4 is a cross-sectional view of a bare-fiber, V-groove encapsulated optical power-limiting device, according to the present invention.

FIG. 4b is an end elevation of the structure of FIG. 4a.

FIG. 5 is a cross-sectional view of a bare-fiber, V-groove encapsulated optical, angled, power-limiting device, according to the present invention.

FIG. 5b is an end elevation of the structure of FIG. 5a.

FIG. 6 is a cross-sectional view of a bare-fiber, ferrule or guiding tube-encapsulated optical power-limiting device, according to the present invention.

FIG. 6b is an end elevation of the structure of FIG. 6a.

FIG. 7 is a cross-sectional view of a bare-fiber, ferrule or guiding tube-encapsulated optical, angled, power-limiting device, according to the present invention.

FIG. 7b is an end elevation of the structure of FIG. 7a.

Figure 2:
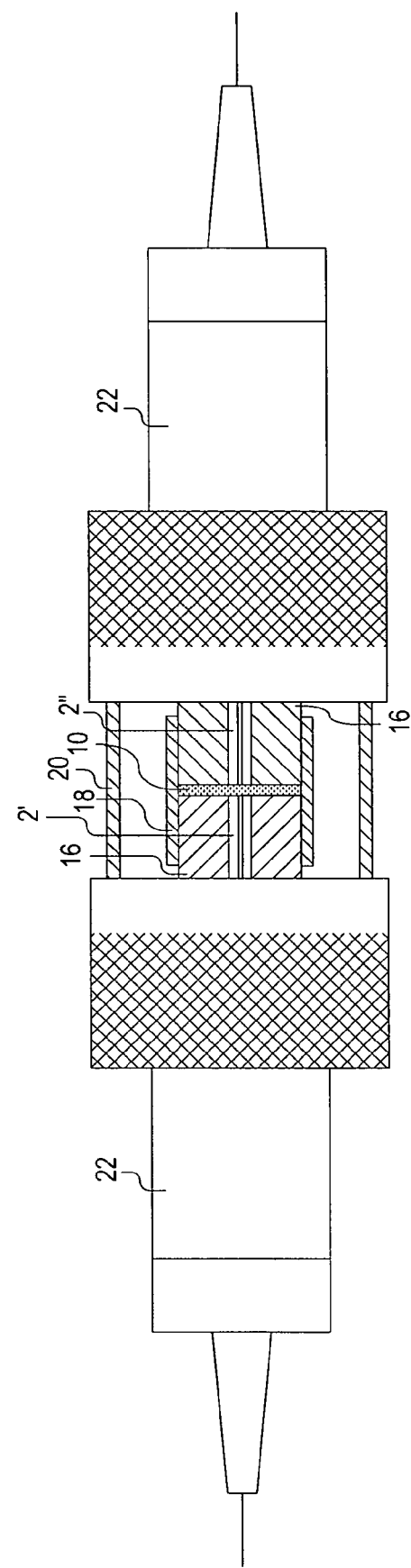
Figure 8:
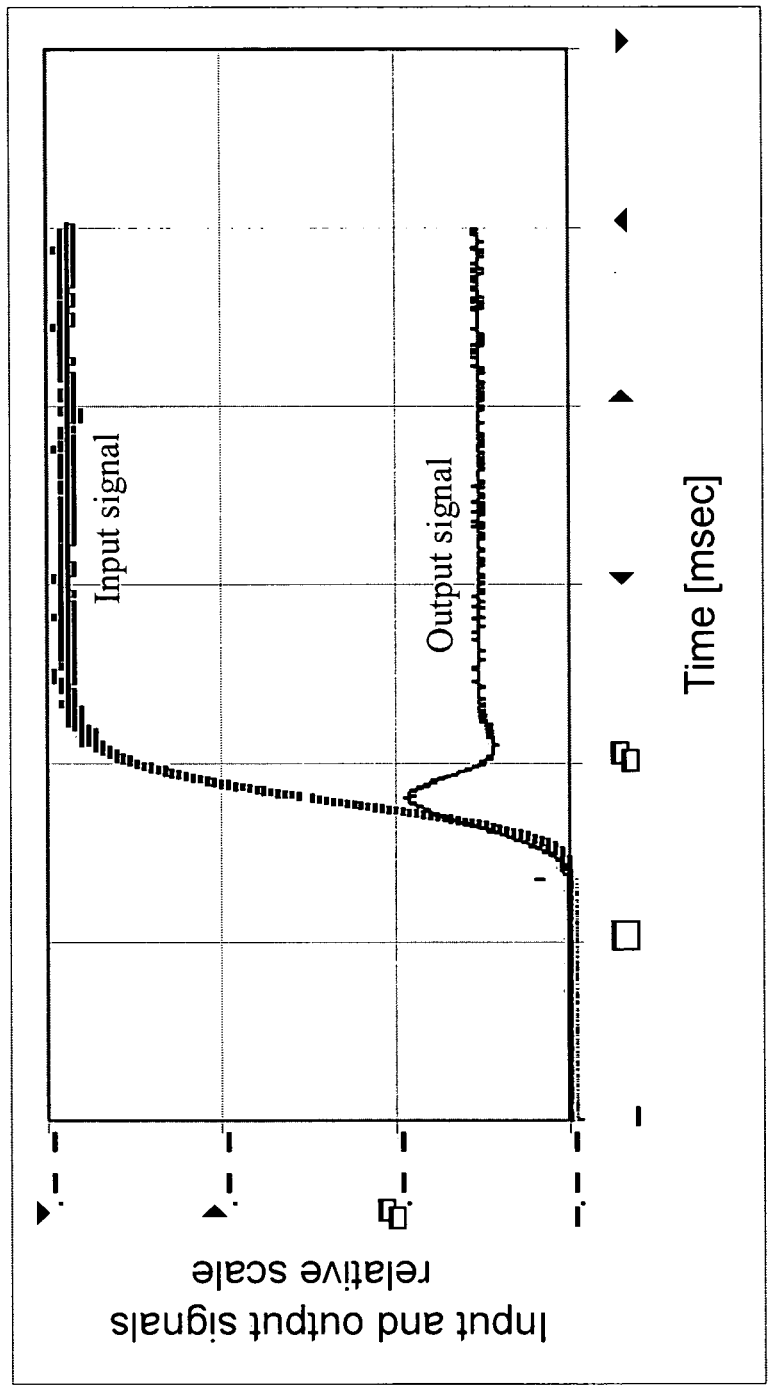

FIG. 8 is an input-output curve of the optical power-limiting device shown in FIG. 2.

Figure 9:
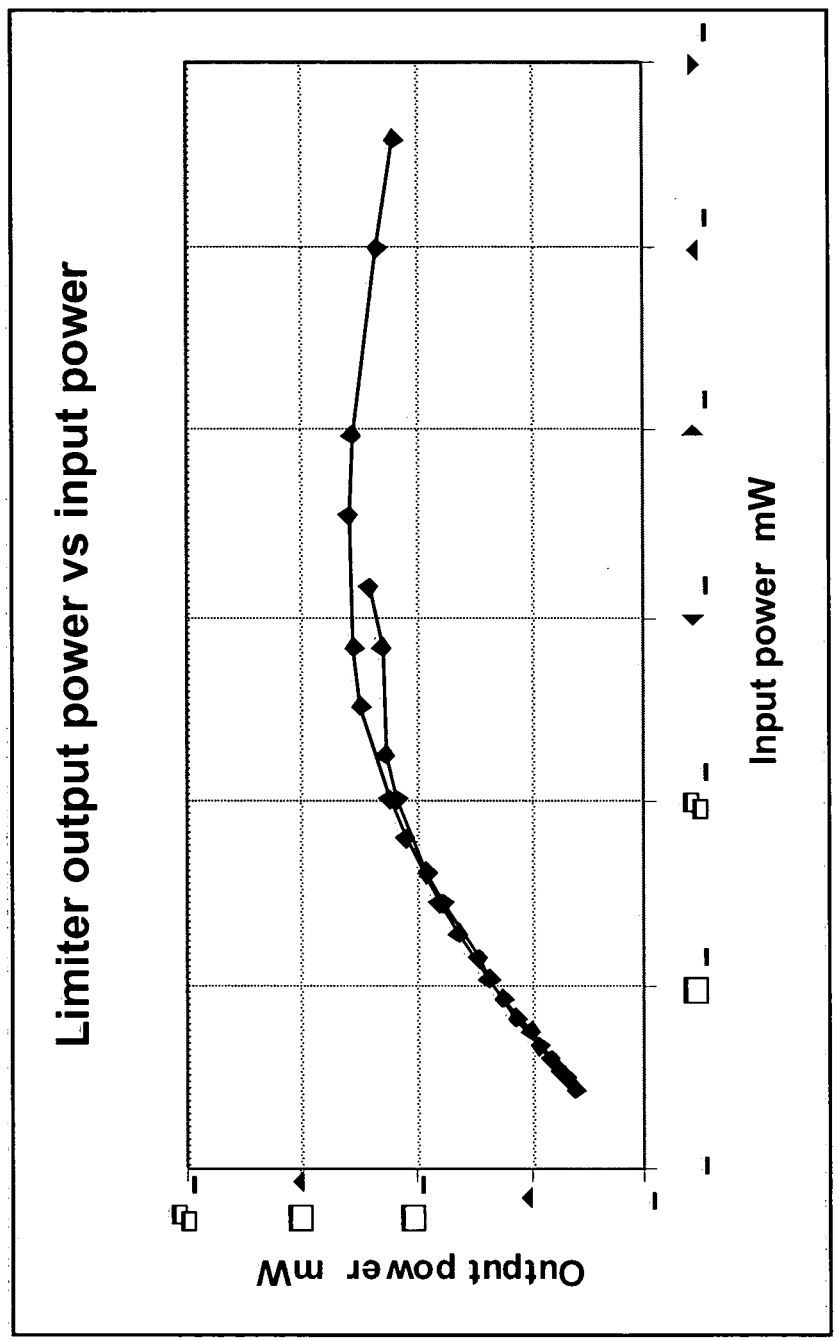

FIG. 9 is a time response curve of the optical power-limiting device of FIG. 8.

Figure 10:
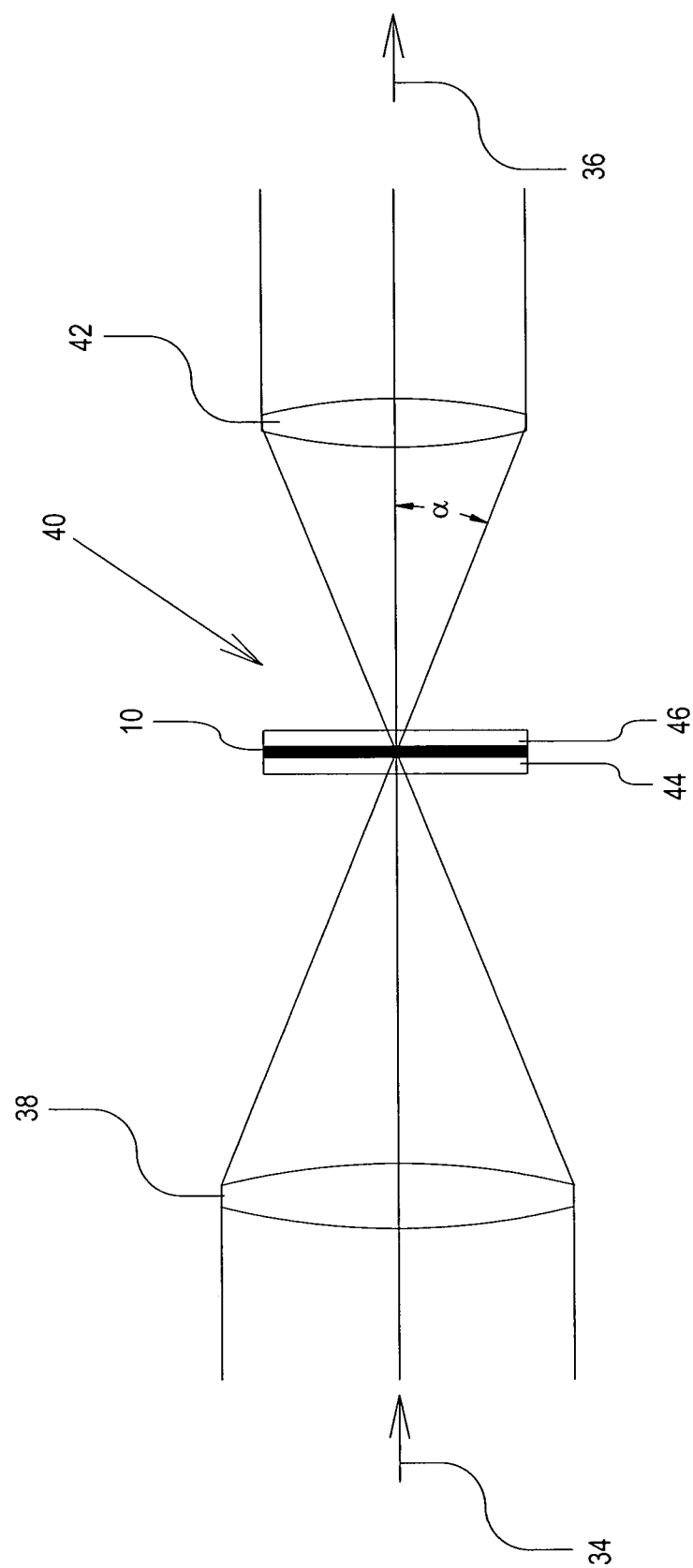

FIG. 10 is a cross-sectional view of an optical-limiting solid mixture placed at the focus of a lens of an optical system with a light-collecting lens of given numerical aperture, according to the present invention.

Figure 11:
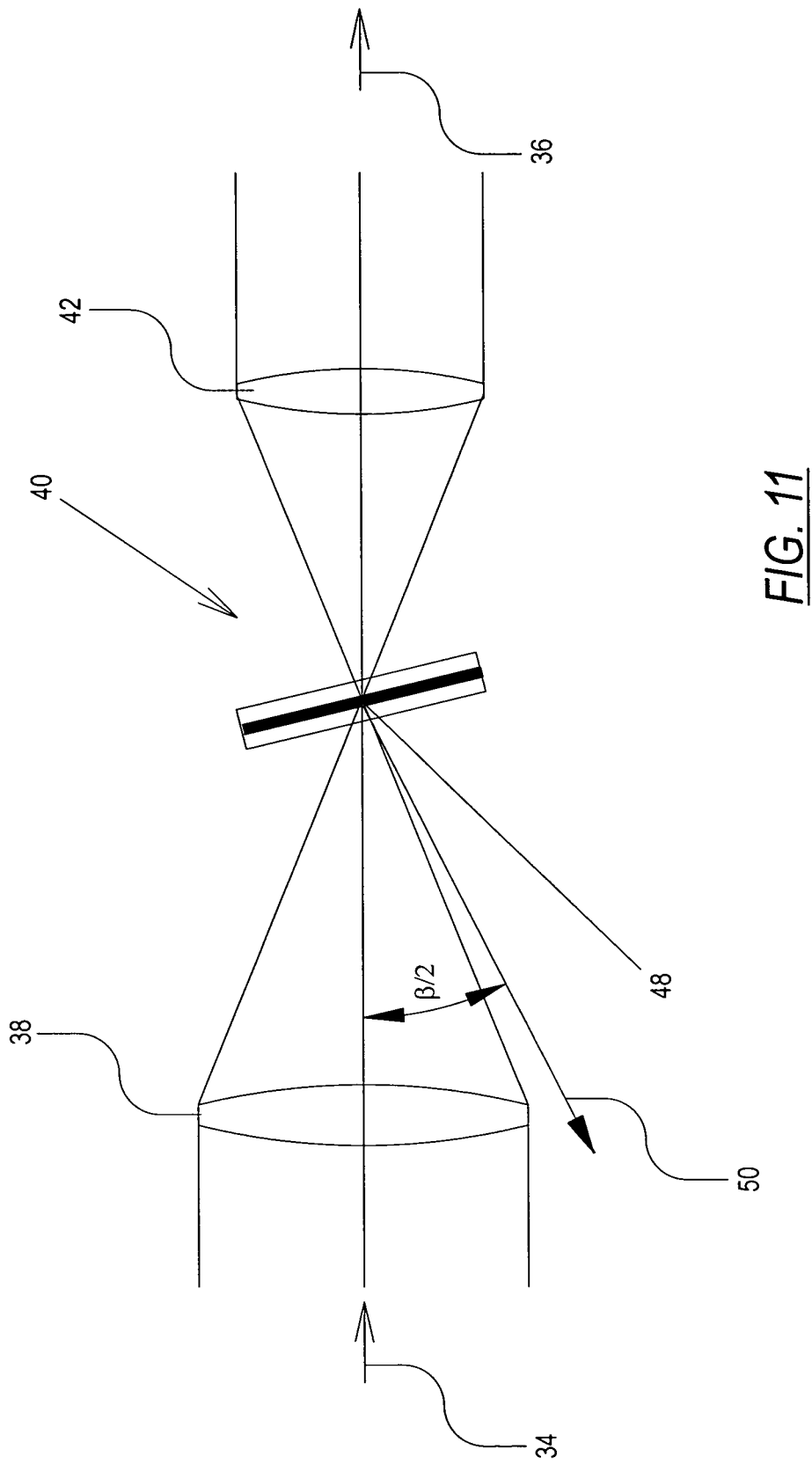

FIG. 11 is a cross-sectional view of an optical-limiting solid mixture placed at the focus of a lens of an optical system with a light-collecting lens of given numerical aperture, with the optical-limiting solid mixture oriented at an angle to eliminate back reflection, according to the present invention.

FIG. 12 is a cross-sectional view, of an optical-limiting system in which protection is provided from all angles.

Figure 12A:
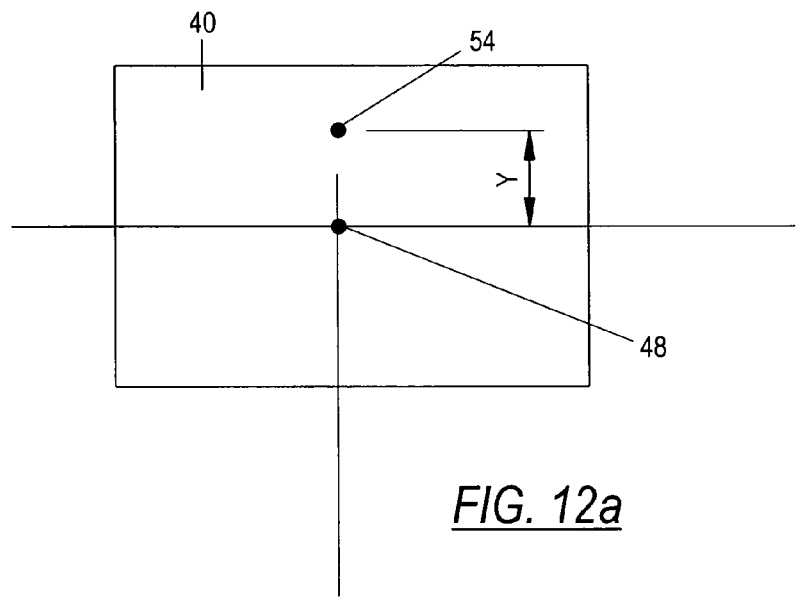
Figure 12B:
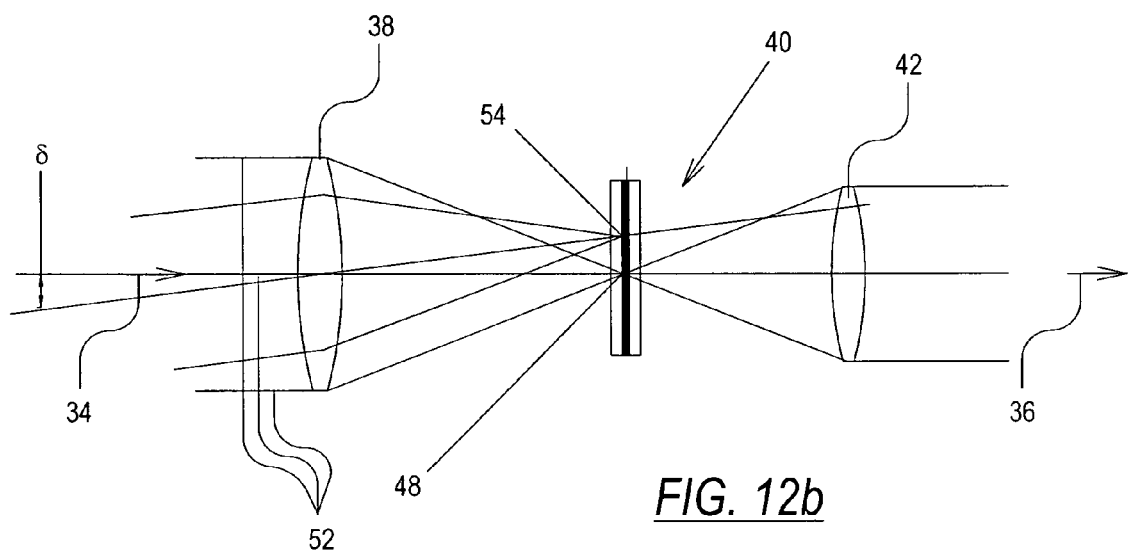

FIG. 12b is an end elevation of the structure of FIG. 12a.

FIG. 13 is a cross-sectional view of an optical-limiting solid mixture placed in the core of a waveguide or optical fiber.

FIG. 13b is an end elevation of the structure of FIG. 13a.

FIG. 14a is a cross-sectional view of an optical-limiting solid mixture placed in the core of a waveguide or optical fiber in which the interface to the optical-limiting solid mixture is at an angle to eliminate back reflection.

FIG. 14b is an end elevation of the structure of FIG. 14a.

DETAILED DESCRIPTION OF PREFERRED EMBODIMENTS

In the limiter configuration and operation illustrated in FIGS. 1a and 1b, light enters a fiber or waveguide 2 having a core 4 and a cladding 6 (e.g., SMF 28 by Corning, USA), and impinges on an optical-limiting solid mixture 10 placed at the exit of the core 4. The optical-limiting solid mixture 10 is composed of a suspension of light absorbing particles, smaller than the wavelength of visible light (smaller than 0.5 microns) and preferably smaller than 0.1 microns (nano-powder) equally distributed or suspended in a solid, e.g., polymer, material having a large negative index change with temperature (dn/dT). The absorbing material include at least one metallic or non-metallic material selected from the group consisting of: Ag, Au, Ni, Va, Ti, Co, Cr, C, Re, Si and mixtures of such materials. The polymer host material, having a large (dn/dT), may be: PMMA or its derivatives, polymer based on epoxy resins, glass, spin-on glass (SOG) or other sol-gel materials. The optical-limiting function begins with light absorption in the suspended small particles, according to their absorption spectra. When the particles are heated they conduct heat to their surroundings, leaving hot spots in the volume surrounded by a decreasing temperature gradient in their neighborhood. These hot volumes can decrease the light transmission through the optical-limiting solid mixture 10 by several mechanisms, one of which is scattering due to the refractive index spatial fluctuations created by the hot particle and its surrounding medium. Other, less dominant mechanisms were discussed earlier. The scattered light 12 at angles greater than the numerical aperture of fiber 6 will not propagate through the fiber core 8 and will eventually enter the cladding 6 and is absorbed externally. Some increase in the back-reflected light is seen at that time showing increased scattering in all directions.

The light that is not scattered continues along the optical path and has lower, "limited" power. When the incident power is reduced, the scattering volume, which surrounds each absorbing particle, diminishes. The transmission through the optical-limiting solid mixture 10 returns to its original value, as the scattering process decreases to negligible values. The process may be repeated many times without any permanent damage up to energies that are an order of magnitude or more, larger than the transmitted power limit. When the power is more than an order of magnitude larger than the threshold, the limiter turns permanently opaque thus protecting the components following it from permanent damage.

FIG. 2 illustrates a connector-encapsulated optical power-limiting device, using a limiter perpendicular to the beam propagation direction. The device is symmetrically packed in two PC (Physical Contact) connectors 22 having ferrules 16 in which an input fiber 2' and an output fiber 2" are affixed. The optical-limiting solid mixture 10 is placed in a gap of a few to a few tens of microns separating the two ferrules 16. The sleeve 18 is responsible for the alignment of the two fibers 2' and 2", and a housing 20 provides environmental protection and stability. The thickness of the optical-limiting solid mixture 10 as well as its composition is responsible for the limiting.

Figure 3:
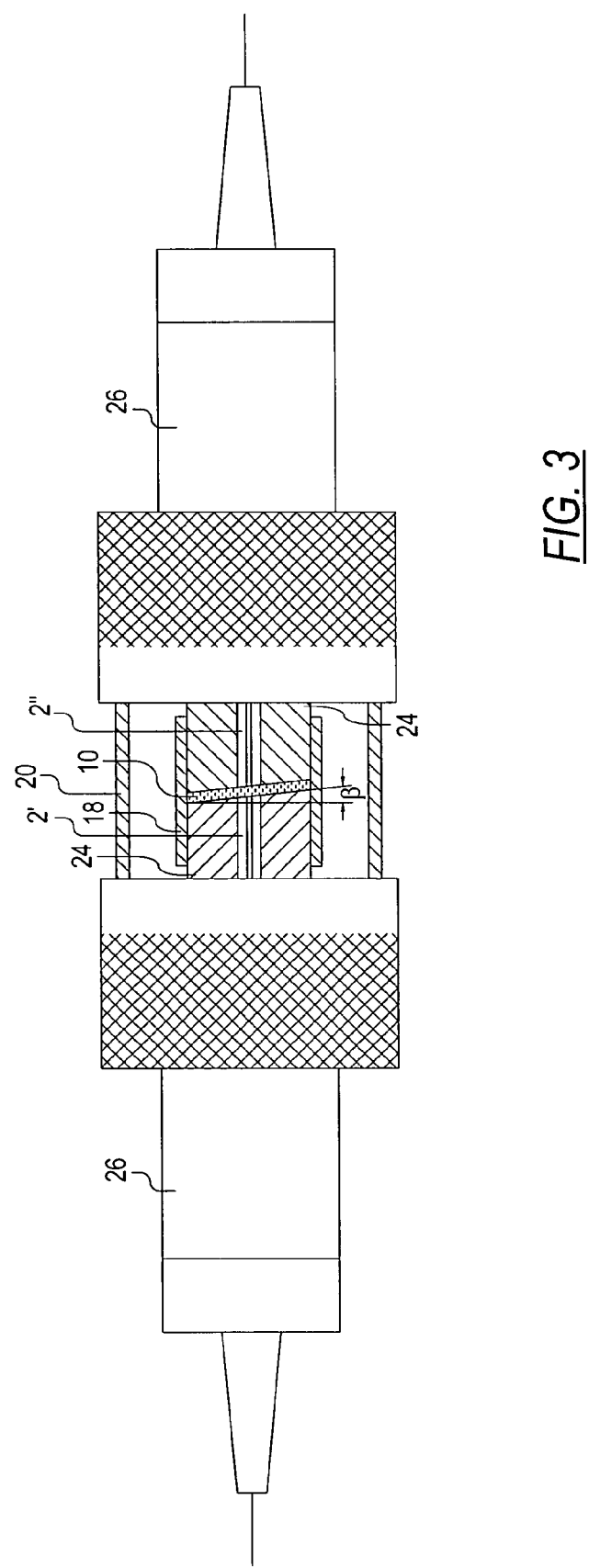

FIG. 3 illustrates a modification of the embodiment of FIG. 2 where the limiter 10 is tilted using APC (Angled Physical Contact) connectors 26 at an angle (e.g., 8°) relative to a plane perpendicular to the beam propagation direction, thus avoiding direct reflections into the core of the input fiber 2'. In this case the surfaces of the ferrules 24 are tilted at an angle β.

Figure 4A:
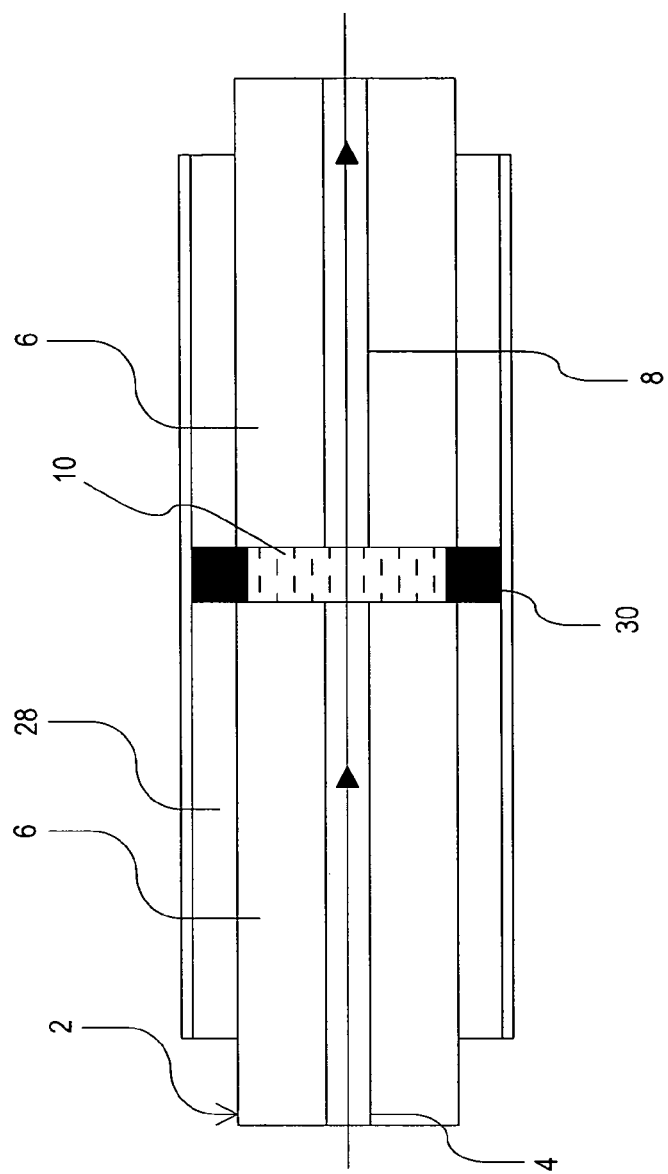
Figure 4B:
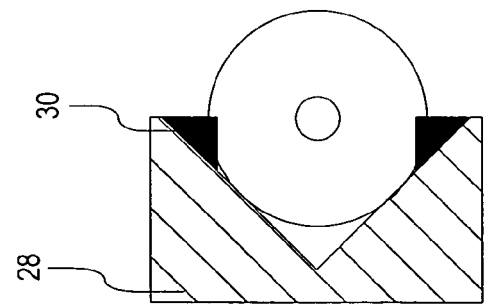

FIGS. 4a and 4b illustrate a cross-sectional view of a bare-fiber, V-groove encapsulated optical power-limiting device. Here the input fiber 2 and the output fiber are affixed in a V-grooved optical bench 28 having two optional spacers 30 to define the inter-fiber distance. The optical-limiting solid mixture 10 is placed in the gap created by the spacers. Alternatively, the space between the fibers may be aligned with the use of a microscope without the use of spacers.

Figure 5A:
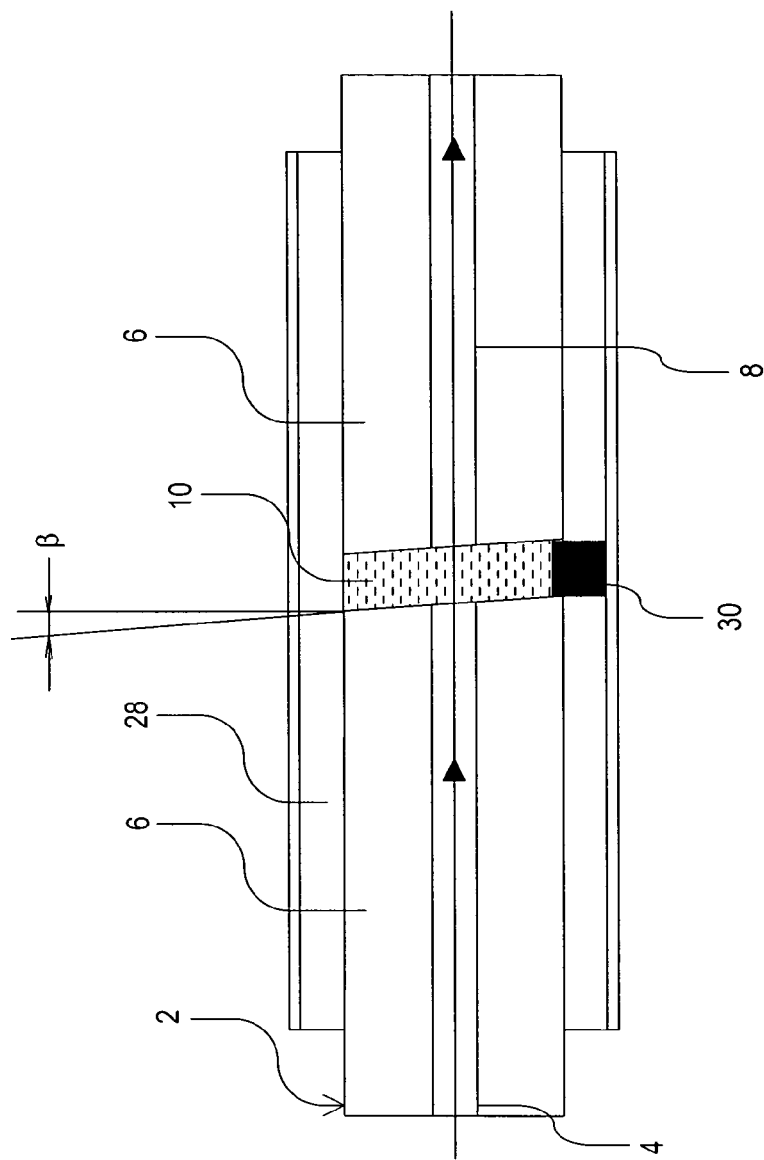
Figure 5B:
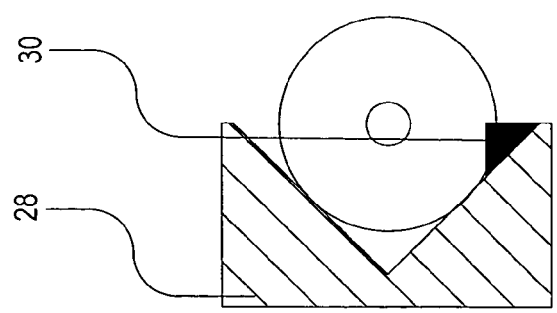

FIGS. 5a and 5b illustrate a cross-sectional view of the bare-fiber, V-groove-encapsulated, angled, optical power-limiting device. Here the input fiber 2 and the output fiber are affixed in a V-grooved optical bench 28 having a spacer 30 to define the inter fiber distance. The optical-limiting solid mixture 10 is placed in the gap created by the spacer; this space is at an angle β, eliminating back reflections into the core.

FIGS. 6a and 6b illustrate a cross-sectional view of bare-fiber ferrule or guiding tube-encapsulated optical, power-limiting device. Here the input fiber 2 and the output fiber are affixed in a ferrule or guiding tube 32 having a spacer 30 to define the inter-fiber distance. The optical-limiting solid mixture 10 is placed in the gap created by the spacer through the side hole.

FIGS. 7a and 7b illustrate a cross-sectional view of the bare-fiber, ferrule or guiding-tube-encapsulated 1, angled, optical power-limiting device. Here the input fiber 2 and the output fiber are affixed in a ferrule or guiding tube 32 having a spacer to define the inter-fiber distance. The optical-limiting solid mixture 10 is placed in the gap created by the spacer; this space is at an angle β that eliminates back reflections into the core.

FIG. 8 shows a typical, experimental, power input-output curve of the power-limiting device. The device used was the embodiment of FIG. 2. The optical-limiting solid mixture 10 in this case is comprised of a commercial epoxy resin (3M Scotch Weld DP100+) mixed with commercial carbon black powder (Alfa No. 39724). The average particle size of the particles is 0.042 micron. A 0.10-0.16% weight percent of carbon particles is mixed into part A of the resin, which is then mixed at 1:1 ratio to part B of the resin. This mixture is cured and assembled as in FIG. 2.

This limiter turns permanently opaque when exposed to powers of 30±1 dBm, which is close to 20 dB (two orders of magnitude) above the threshold power.

FIG. 9 is a time domain response curve of the optical power-limiting device described in FIG. 8, where the upper curve shows the power input to the device and the lower curve the power output from the device.

FIG. 10 illustrates a free space optical limiter in which light enters from the left side as a prime incident ray 34. The incident light is focused by a condensing lens 38 onto the optical-limiting solid mixture 10. Optional entrance and exit windows 44 and 46 are shown with the optical-limiting solid mixture 10 sandwiched in between. The optical-limiting solid mixture and its windows form an optical-limiting assembly 40. Scattered light at an angle greater than a is not collected by a collecting lens 42. The exit ray 36 represents the limited optical output.

FIG. 11 is a variation of the embodiment shown in FIG. 10 in which the optical-limiting assembly 40 is placed at an angle β/2 so that reflected light 50 from point 48 on the limiting assembly 40 does not re-enter the optical system.

FIGS. 12a and 12b illustrate the mechanism of protection via optical limiting of the embodiment of FIG. 10. Assuming rays from infinity, such as prime ray 34, a real image is formed on the optical-limiting solid mixture 10. If a laser beam enters at angle 6, the light is focused on the optical-limiting solid mixture at point 54 which is offset from point 48 by a distance Y. The optical limiting occurs only at the point 54 with light scattering out of the optical system. The rest of the image is unimpaired.

FIGS. 13a and 13b illustrate yet another embodiment in which the optical-limiting solid mixture 10 is used for the core material of a waveguide or optical fiber part 56. The light scattered at a large angle 12 is not propagated down the fiber. This embodiment has the advantage that the absorbed heat is distributed over a large volume, and that it has no insertion loss due to the gap between the fibers or waveguides.

FIGS. 14a and 14b illustrate the embodiment of FIGS. 13a and 13b but with angled (at an angle θ) coupling and decoupling to the core of the optical-limiting solid mixture 10 to prevent back reflection.

It will be evident to those skilled in the art that the invention is not limited to the details of the foregoing illustrated embodiments and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

While particular embodiments and applications of the present invention have been illustrated and described, it is to be understood that the invention is not limited to the precise construction and compositions disclosed herein and that various modifications, changes, and variations may be apparent from the foregoing descriptions without departing from the spirit and scope of the invention as defined in the appended claims.

What is claimed is:

1. An optical power limiter comprising
an input optical transmission element,
an output optical transmission element, and
a power-limiting element disposed between said input and output elements for transmitting optical signals from said input element to said output element, said power-limiting element comprising
an optically transparent solid dielectric matrix material having a refractive index that changes with temperature and containing dispersed light-absorbing nano-powder particles of at least one material that is reversibly heated in response to light above a predetermined optical power level, the heating of said solid nano-powder particles in turn heating said matrix material to produce non-linear changes in the refractive index of said matrix material due to thermal gradients between particles and thereby changing the optical transmission properties of said power-limiting element, said particles having a diameter of less than 0.1 micron and said material being at least one element selected from the group consisting of Ag, Au, Ni, Va, Ti, Co, Cr, C, Re and Si.

2. The optical power limiter of claim 1, wherein said optical-limiting solid mixture comprises light-absorbing particles dispersed in an optically transparent matrix material.

3. The optical power limiter of claim 2, wherein said optically transparent matrix material is a polymeric material.

4. The optical power limiter of claim 2, wherein said optically transparent matrix material is selected from the group consisting of polymethylmethacrylate and its derivatives, epoxy resins, glass, sol-gel material and spin-on glass.

5. The optical power limiter of claim 2, wherein said optically transparent matrix material is an inorganic glass material.

6. The optical limiter of claim 1, wherein said solid mixture is placed in an optical system of limited numerical aperture.

7. The optical limiter of claim 6, in which said solid mixture is packaged between the ferrule tips of two physical contact mated connectors.

8. The optical limiter of claim 6, wherein said solid mixture is packaged between two bare fibers, in line.

9. The optical limiter of claim 8, wherein said bare fibers are aligned using a V groove.

10. The optical limiter of claim 8, wherein said bare fibers are aligned using a ferrule with a hole.

11. The optical limiter of claim 8, wherein said bare fibers form opposed end faces angled to reduce back reflection.

12. The optical limiter of claim 8, wherein said bare fibers form opposed end faces, and including a spacer between said opposed end faces to provide a preselected distance between said end faces.

13. The optical limiter of claim 1, in which said solid mixture is the core material of a waveguide.

14. The optical power limiter of claim 1 wherein limiting said optical limiting solid mixture turns permanently opaque when exposed to predetermined powers above a threshold power.

15. An optical power-limiting method for limiting the optical power of
optical signals transmitted from an input optical transmission element to an output optical transmission element, comprising
placing a power-limiting element between said input and output elements, said power-limiting element comprising an optically transparent solid dielectric matrix material having a refractive index that changes with temperature and containing dispersed light-absorbing solid nano-powder particles of at least one element selected from the group consisting of Ag, Au, Ni, Va, Ti, Co, Cr, C, Re and Si and having a diameter of less than 0.1 micron, and
reversibly heating said nano-powder particles in response to light above a predetermined optical power level, the heating of said solid nano-powder particles in turn heating said matrix material to produce non-linear changes in the refractive index of said matrix material due to thermal gradients between particles and thereby changing the optical transmission properties of said power-limiting element.

16. The optical power-limiting method of claim 15, wherein said power-limiting element comprises an optical-limiting solid mixture containing particles of at least one material that produces reversible thermal changes in response to light above a predetermined optical power level.

17. The optical power-limiting method of claim 15, wherein said optical-limiting solid mixture comprises light-absorbing particles dispersed in an optically transparent matrix material.

18. The optical power-limiting method of claim 16, wherein said optically transparent matrix material is a polymeric material.

19. The optical power-limiting method of claim 16, wherein said optically transparent matrix material is at least one material selected from the group consisting of polymethylmethacrylate and its derivatives, based on epoxy resins, glass, sol gel derived and spin-on glass.

20. The optical power-limiting method of claim 16, wherein said optically transparent matrix material is an inorganic glass material.

21. The optical power-limiting method of claim 16 wherein said solid mixture is placed in an optical system of limited numerical aperture.

22. The optical power-limiting method of claim 16, in which said solid mixture is packaged between the ferrule tips of two physical contact mated connectors.

23. The optical power-limiting method of claim 16, wherein said solid mixture is packaged between two bare fibers, in line.

24. The optical power-limiting method of claim 23, wherein said bare fibers are aligned using a V groove.

25. The optical power-limiting method of claim 23, wherein said bare fibers are aligned using a ferrule with a hole.

26. The optical power-limiting method of claim 23, wherein said bare fibers form opposed end faces angled to reduce back reflection.

27. The optical power-limiting method of claim 23, wherein said bare fibers form opposed end faces, and including a spacer between said opposed end faces to provide a preselected distance between said end faces.

28. The optical power-limiting method of claim 16, in which said solid mixture is the core material of a waveguide.

29. The optical power-limiting method of claim 28 wherein said optical limiting solid mixture turns permanently opaque when exposed to predetermined powers above a threshold power.

\* \* \* \* \*